United States Patent
Averesch

(10) Patent No.: US 8,936,670 B2
(45) Date of Patent: Jan. 20, 2015

(54) SPRAY TYPE DEAERATOR

(71) Applicant: Stork Thermeq B.V., Hengelo (NL)

(72) Inventor: Jan Johan Averesch, Rijssen (NL)

(73) Assignee: Stork Thermeq B.V., Hengelo (NL)

( * ) Notice: Subject to any disclaimer, the term of this patent is extended or adjusted under 35 U.S.C. 154(b) by 170 days.

(21) Appl. No.: 13/627,219

(22) Filed: Sep. 26, 2012

(65) Prior Publication Data

US 2013/0074696 A1    Mar. 28, 2013

(30) Foreign Application Priority Data

Sep. 27, 2011    (EP) ..................... 11182915

(51) Int. Cl.
*B01D 19/00* (2006.01)
*B01D 1/16* (2006.01)
*B01D 1/20* (2006.01)
*C02F 1/20* (2006.01)
(Continued)

(52) U.S. Cl.
CPC .. *B01D 1/16* (2013.01); *B01D 1/20* (2013.01); *B01D 19/001* (2013.01); *B01D 19/0047* (2013.01); *C02F 1/20* (2013.01); *C02F 1/006* (2013.01); *C02F 1/02* (2013.01)
USPC ................... 95/244; 95/246; 95/260; 95/264; 96/200; 96/203; 239/282; 239/602

(58) Field of Classification Search
CPC .... B01D 19/001; B01D 19/0047; B01D 1/20; F22D 1/50; C02F 1/20; C02F 1/006
USPC .............. 95/244, 246, 260, 264; 96/200, 203; 239/282, 602
See application file for complete search history.

(56) References Cited

U.S. PATENT DOCUMENTS

| 2,689,018 | A |   | 9/1954 | Kittredge |
| 3,096,166 | A | * | 7/1963 | Kolthof et al. ................... 96/203 |
| 4,404,929 | A | * | 9/1983 | Brand et al. ................... 122/412 |

(Continued)

FOREIGN PATENT DOCUMENTS

| DE | 24 54 423 |    | 5/1976 |
| DE | 26 24 720 | A1 | 12/1977 |

(Continued)

OTHER PUBLICATIONS

Extended European Search Report Application No. 12185047.3 dated Jan. 17, 2013, 5 pages.
Extended European Search Report Application No. 11182915.6 dated Feb. 17, 2012, 5 pages.

*Primary Examiner* — Duane Smith
*Assistant Examiner* — Douglas Theisen
(74) *Attorney, Agent, or Firm* — Thomas|Horstemeyer, LLP

(57) ABSTRACT

The invention relates to a device for treating water of the spray type, such as a deaerator or preheater. According to the invention the connection between the vessel (12) and the sprayer (34) and the supply of water to be treated comprises a pipe section (40) having a first open end in fluid communication with a treatment chamber and a second open end provided with a first flange (60) for connecting to a sprayer (34), the sprayer (34) comprising a sprayer flange (68) connected to said first flange (60), the sprayer flange (68) carrying the sprayer (34), which is in fluid communication with a connecting pipe (72) at one end thereof, the connecting pipe (72) extending through the first flange (60) to a coupling flange (74) for connection to the supply of water to be treated.

14 Claims, 4 Drawing Sheets

(51) Int. Cl.
*C02F 1/00* (2006.01)
*C02F 1/02* (2006.01)

(56) References Cited

U.S. PATENT DOCUMENTS

| | | | | |
|---|---|---|---|---|
| 4,624,686 | A | * | 11/1986 | Andrieux et al. ............... 96/203 |
| 4,701,191 | A | * | 10/1987 | Kreuwel et al. ............... 96/203 |
| 5,310,417 | A | * | 5/1994 | Bekedam ....................... 96/157 |
| 5,476,525 | A | * | 12/1995 | Bekedam ....................... 96/408 |

FOREIGN PATENT DOCUMENTS

| | | | |
|---|---|---|---|
| DE | 2624720 | * | 12/1977 |
| EP | 0 028 664 | A1 | 5/1981 |
| EP | 0 920 895 | | 6/1999 |
| EP | 1 310 294 | A1 | 5/2003 |
| EP | 1310294 | A1 * | 5/2003 |

* cited by examiner

SPRAY TYPE DEAERATOR

CROSS-REFERENCE TO RELATED APPLICATIONS

This application claims priority to European Application entitled "SPRAY TYPE DEAERATOR" having Serial No. 11182915.6, filed on Sep. 27, 2011, which is incorporated by reference as if fully set forth herein.

FIELD OF DISCLOSURE

In a first aspect the invention relates to a device for treating water, in particular for use as a spray type deaerator for degassing water or for use as a preheater for preheating water. A deaerator is a device for degassing water, e.g. frequently used for removal of air and other dissolved gases from the feedwater to boilers. Boiler plants often have preheaters with a limited capacity, regarding preheating capacity as well as storage capacity. The device according to the invention can also be used as a preheater having a relatively large preheating capacity and storage volume compared to the preheaters conventionally applied.

BACKGROUND

Typically degassing devices are classified according to the principles of the feed of the water to be degassed. In tray type deaerators water to be degassed flows along trays like a cascade, whether in a dome shaped section on top of the main vessel, whether in the main vessel itself or in a separate tank. In a spray type deaerator water to be degassed is sprayed into a vessel defining a deaeration chamber. The invention concerns a spray type deaerator.

The physical deaeration process occurring in a spray type deaerator comprises two stages: a pre-deaeration stage wherein water to be degassed is sprayed in the steam space (also known as pre-deaeration zone) of the deaeration chamber, usually the top area at one end of the vessel, and a final-deaeration in the main volume of the water contained in the deaeration chamber, where steam is brought in close contact with the water to be degassed. In the pre-deaeration zone the sprayer ensures heating of the water to saturation temperature and offers a large area for mass and heat transfer. The sprayed water is preheated by steam emerging from the main water volume contained in the vessel, into which steam is introduced, e.g. injected. At saturation conditions the solubility of the gases, e.g. oxygen, contained in the water is (almost) zero, resulting in a transfer of gases from the sprayed droplets to the surrounding steam atmosphere. Non-condensed gases and a small amount of steam are allowed to escape from the vessel. Final deaeration taking place in the main volume of water contained in the deaeration chamber is brought about by introducing steam or hot condensate. The treated water is discharged from the deaeration chamber, usually at the bottom of the vessel.

In a known spray type deaerator the top of the vessel is provided with a connecting pipe ending in a vessel flange for further connection to the source of water to be degassed. Typically this water has an overpressure compared to the pressure in the vessel. The flange is machined such that an annular carrying rim is provided adjacent the inner wall. A sprayer unit is suspended from a flange, which is bolted to the annular carrying rim of the flange, such that one or more spray nozzles of the sprayer unit are situated in the pre-deaeration zone of the deaeration chamber. The supply conduit of water is connected to the vessel flange via a counter flange. This vessel flange is not of a standard size due to its necessity of allowing the recessed rim to be machined. Therefore the vessel flange is manufactured on demand according to particular specifications. As a result this design of the vessel and sprayer involves high manufacturing costs.

From U.S. Pat. No. 2,689,018 A an apparatus for deaerating water is known, which comprises a tank having a water inlet pipe at its top, steam inlet pipe, water outlet pipe and drain line on its bottom and a vent for relatively non-condensable gases, principally air. In particular the apparatus has a neck, provided at the top of the tank, having a flange. A cover plate having a central aperture is bolted in registry with the opening in the water inlet pipe, which is bolted to the top of the cover plate. A cylindrical plate is formed integrally with a top plate, which is bolted to cover plate and to water inlet pipe. A depending tube is formed integrally with top plate in alignment with the opening in water inlet pipe. The top plate is provided with an aligned central opening allowing free communication between pipe and depending tube. A sprayer is mounted to this tube. This known construction is complex and is not easy to (dis)assemble for the purpose of servicing and maintenance.

SUMMARY

It is an object of the invention to develop a new or alternative design of a spray type water treatment device, in particular for treating water or preheating water in boiler applications allowing the use of standard sized parts for suspending the spray unit in the treatment chamber and for connecting thereof to the feed of water to be treated, in particular without the necessity of further machining the vessel flange.

It is a further object of the invention to reduce manufacturing, servicing and/or maintenance costs of a spray type water treatment device.

According to the invention one or more objects are achieved by a device for treating water including a vessel defining a treatment chamber, at least one sprayer, which is arranged in the top of the treatment chamber and is in fluid communication via a connection with a feed of water that is to be treated, at least one gas outlet, which is arranged on the top side of the vessel and is in fluid communication with the treatment chamber, for gases, which have been separated off from the water during treatment, at least one treating fluid inlet which is arranged in the vessel and has a feed connection for hot treating fluid and which opens out into the treatment chamber, and at least one water outlet for treated water, wherein the connection between the vessel and the sprayer and the feed of water to be treated comprises a pipe section having a first open end in fluid communication with the treatment chamber and a second open end provided with a first flange for connecting to a sprayer unit, the sprayer unit comprising a sprayer flange connected to said first flange, the sprayer flange carrying the sprayer, which is in fluid communication with a connecting pipe at one end thereof, the connecting pipe extending through the first flange to a coupling flange for connection to the feed of water.

The device for treating water according to the invention comprises a vessel having various inlets and outlets as usually employed for the various fluids involved. However according to the invention the sprayer is suspended directly to a sprayer flange (to be associated with the flange of the vessel) and in fluid communication with a connecting pipe extending from the sprayer flange to a spaced apart coupling flange at its other end, the coupling flange being connected to the supply of water to be treated, e.g. boiler. The connecting pipe, sprayer flange and coupling form an integral part.

This integral design of flanges and connecting pipe allows using off the shelf components without the need of additional machining the vessel flange, thereby saving significant costs. Furthermore by spatially separating the connection to the vessel and to the feed of water to be treated respectively assembling and disassembling is less complex, making service and maintenance more easily to perform.

In an embodiment the connecting pipe has a first lower end carrying the sprayer and wherein the coupling flange is provided at a second upper end, the sprayer flange being provided at a position between the respective ends Preferably the first (vessel) flange and the sprayer flange are of the same size. More preferably, they are of a commercially available, off-the-shelf size.

Here it is to be noted that depending on the conditions steam, pressurized hot water and a steam/water mixture can be used, which for sake of simplicity are together indicated by the expression "hot treating fluid" in the claims of this application.

In a second aspect the invention relates to an assembly of sprayer and connectors, the assembly for use in a device for treating water, the assembly connectable to a mating counter flange, the sprayer flange carrying the sprayer, which is in fluid communication with a connecting pipe at one end thereof, the opposite end of the connecting pipe having a coupling flange for connection to a feed of water.

Furthermore the invention relates to the use of a device according to the invention illustrated above as a deaerator for degassing water, i.e. a device for degassing water, comprising a vessel defining a deaeration chamber, at least one sprayer, which is arranged in the top of the deaeration chamber and is in fluid communication via a connection with a supply of water that is to be degassed, at least one gas outlet, which is arranged on the top side of the vessel and is in fluid communication with the deaeration chamber, for gases, which have been separated off from the water, at least one degassing fluid inlet, which is arranged in the vessel and has a feed connection for hot degassing fluid and which opens out into the deaeration chamber, and at least one water outlet for degassed water, wherein the connection between the vessel and the sprayer and the supply of water to be degassed comprises a pipe section having a first open end in fluid communication with the deaeration chamber and a second open end provided with a first flange for connecting to a sprayer unit, the sprayer unit comprising a sprayer flange connected to said first flange, the sprayer flange carrying the sprayer, which is in fluid communication with a connecting pipe at one end thereof, the connecting pipe extending through the first flange to a coupling flange for connection to the supply of water. In such a device water to be degassed is fed via the sprayer into the deaeration chamber within the vessel, while hot degassing fluid is introduced in the deaeration chamber via the degassing fluid inlet usually using a manifold having multiple outlet openings. Gas separated off is vented via the gas outlet. Degassed water is discharged from the deaeration chamber via the degassed water outlet. Water recirculating in the plant may also be added to the deaerator via a separate inlet.

Similarly the device according to the invention can be used as preheater having a buffer. This buffer is advantageous in case of failure of one or more preheaters usually employed but having a considerable smaller capacity. Such a preheater for preheating water, e.g. in a boiler application, comprises a vessel defining a heat treatment chamber, at least one sprayer, which is arranged in the top of the heat treatment chamber and is in fluid communication via a connection with a supply of water that is to be heated, at least one gas outlet, which is arranged on the top side of the vessel and is in fluid communication with the heat treatment chamber, for gases, which have been separated off from the water, at least one heating fluid inlet, which is arranged in the vessel and has a feed connection for hot heating fluid and which opens out into the heat treatment chamber, and at least one water outlet for heated water, wherein the connection between the vessel and the sprayer and the supply of water to be heated comprises a pipe section having a first open end in fluid communication with the heat treatment chamber and a second open end provided with a first flange for connecting to a sprayer unit, the sprayer unit comprising a sprayer flange connected to said first flange, the sprayer flange carrying the sprayer, which is in fluid communication with a connecting pipe at one end thereof, the connecting pipe extending through the first flange to a coupling flange for connection to the supply of water. Operation of the preheater is similar to the operation of the deaerator as discussed above.

BRIEF DESCRIPTION OF THE DRAWINGS

The invention is further illustrated in the attached drawing, wherein.

Throughout the figs. the same reference numerals are used for indicating the same components.

DETAILED DESCRIPTION OF THE DISCLOSURE

Figure 1:
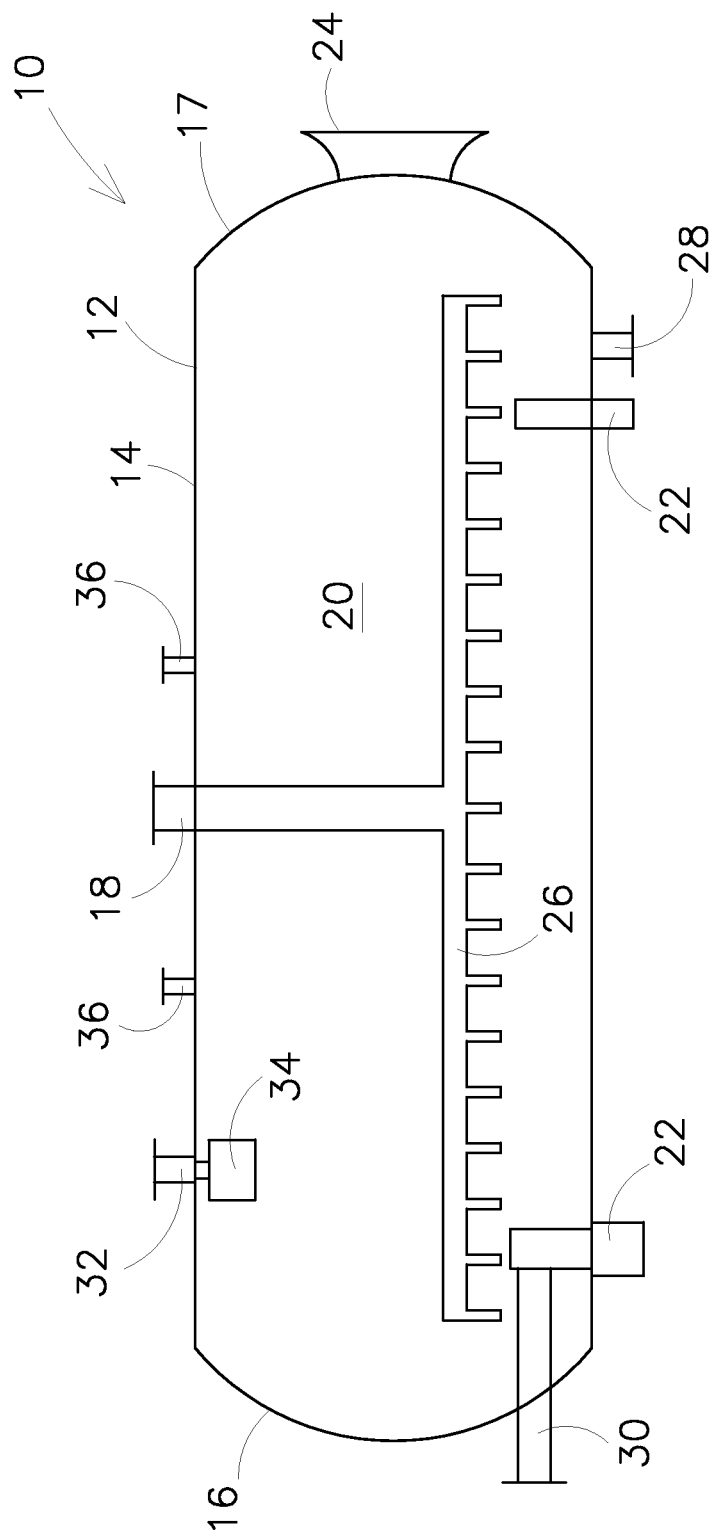
FIG. 1 is a diagrammatic presentation of an embodiment of a spray type deaerator.

The invention is illustrated by means of a drawing of an embodiment of a spray type deaerator, which is a preferred application of the invention. FIG. 1. diagrammatically shows such an embodiment of a spray type deaerator, indicated by reference numeral 10 in its entirety. The deaerator 10 comprises a cylindrical tank or vessel 12, which is horizontally arranged. A cylindrical wall 14 and left and right hand end walls (heads) 16 and 17 respectively of the tank 12 delimit a deaeration chamber 20, wherein during operation degassing of water occurs. Saddles 22 are provided for supporting the tank 12. In the embodiment shown the tank 12 is provided with a manhole 24 in the right hand end wall 17. A central steam inlet 18 extends through the top of cylindrical wall 14 into the tank 12 and is connected to a steam manifold 26 for delivery of steam throughout the deaeration chamber 20, which manifold is arranged in the lower half of the deaeration chamber 20 in the embodiment shown. The position of the manifold depends inter alia on the overall design of the device and the particular operation conditions to be applied. E.g. the manifold may be positioned in the upper half of the deaeration chamber. In the bottom part of the cylindrical wall 14 an outlet 28 for treated water is present. In the left hand end wall 16 an inlet 30 for additional hot water (condensate that is already degassed and circulates in the overall plant) is provided for introducing water into the deaeration chamber 20. Furthermore, a connection—here condensate inlet 32—connected to a sprayer unit 34 comprising at least one sprayer for spraying condensate to be degassed in the steam space of deaeration chamber 20 is provided in the top of the cylindrical wall 14 in the vicinity of left hand end wall 16. The source or feed of water to be treated connected to inlet 32 is not shown in this drawing. On top of the tank 12 several vents 36 as gas outlets for discharging gases and steam are positioned. Internal baffles (not shown) may be provided in the deaeration chamber for forcing the water flow along a particular flow path.

Figure 2:
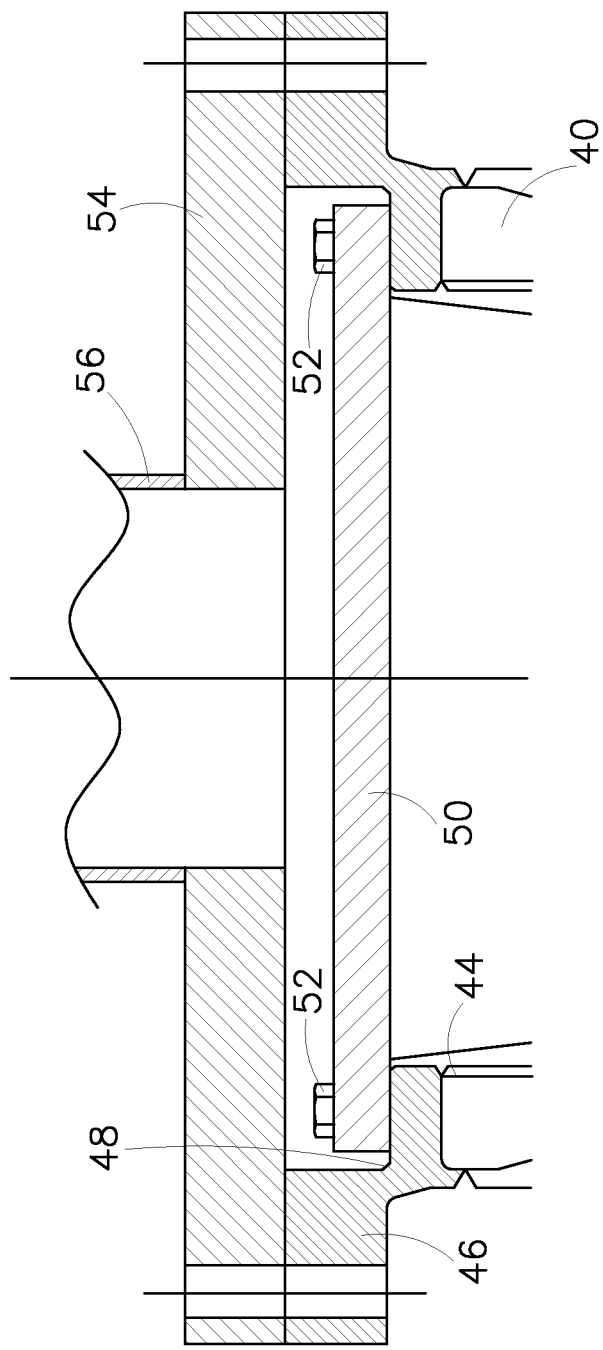
FIG. 2 shows the arrangement of a prior art spray unit connected to the vessel of a spray type deaerator.

FIG. 2 shows the arrangement of the sprayer unit 34 in the deaerator 10 according to a prior art embodiment, as described in the introductory part of the specification The connection 32 comprises a pipe section 40 on top of the cylindrical wall of the tank that opens into the deaeration chamber at one end thereof. To the other end 44 of pipe section 40 a special flange 46 e.g. sized 32" is welded. This special flange 46 comprises an annular carrying rim 48 made by machining for connecting to a similarly specially made sprayer flange 50 using bolts 52. The sprayer flange 50 carries the sprayer unit (not shown in FIG. 2) including e.g. nozzle(s) and filter(s), if any. The outer rim of special flange 46 is connected to a large counter flange 54 of a connecting pipe 56, usually an elbow section, having a further but smaller flange for further connection to the water supply conduit (also not shown). On its turn the connecting pipe is connected to the source of water to be treated.

Figure 3:
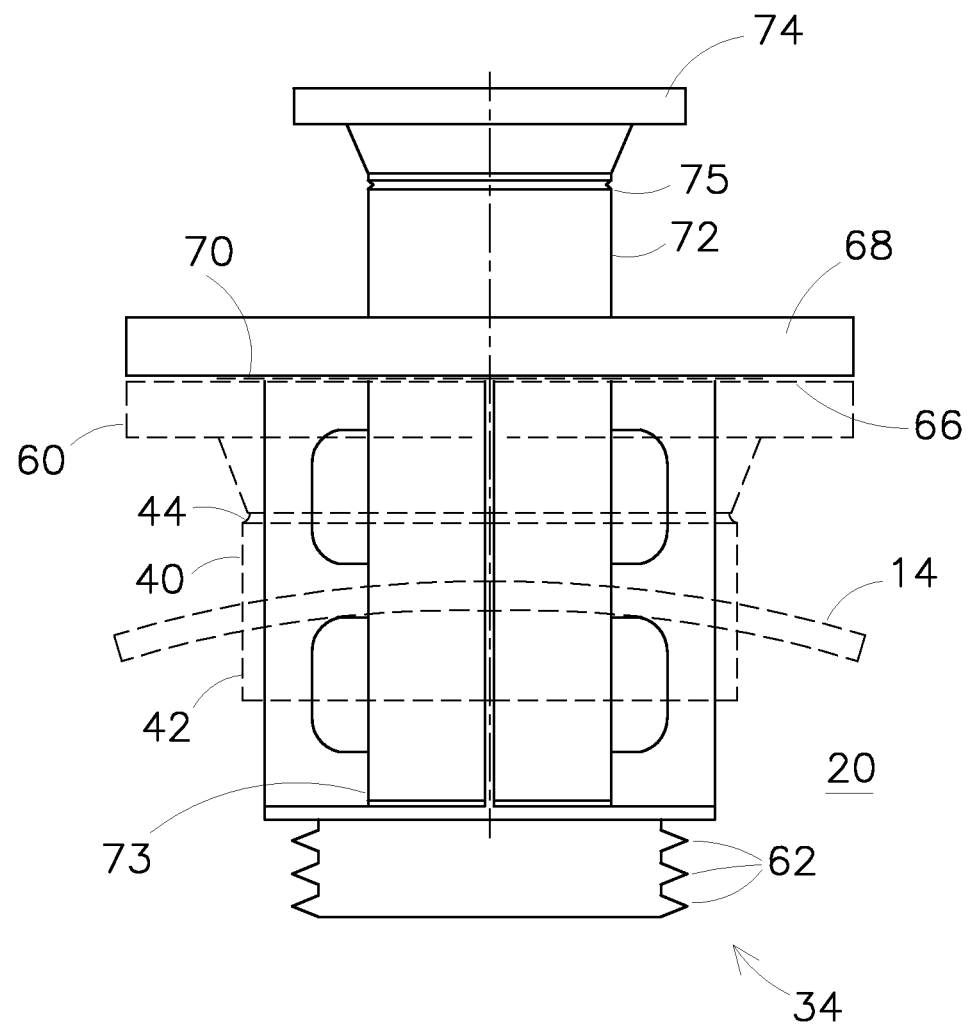
FIG. 3 is an embodiment of the arrangement of a spray unit connected to the vessel of a spray type deaerator according to the invention.

FIG. 3 shows the basic arrangement according to the invention. Broken lines indicate the tank and components thereof. Solid lines show the assembly of sprayer unit, connecting pipe and flanges. Again a connection 32 comprising pipe section 40 is provided on top of the cylindrical wall 14 opening into the deaeration chamber 20 at an end 42 thereof. The other end 44 of the pipe section 40 is welded to a standard sized off the shelf vessel flange 60 e.g. 26", not having a recessed annular carrying rim. A sprayer unit 34 comprising e.g. one or more discs 62 and filter, if present, is carried at the underside 66 of sprayer flange 68 having similar dimensions as the vessel flange 60. The flanges 60 and 68 are fastened to each other in a usual manner, e.g. by means of bolts not shown, interposing a gasket 70 between the flange surfaces directed to one another. The sprayer flange 68 is welded to a short connecting pipe section 72. This section extend through the flange 68 into the tank 12 and carries the sprayer unit 34 at its lower end 73. The opposite end 75 is provided with a smaller flange 74 for connecting to the water feed conduit (again not shown). The flanges 68 and 74 are spaced apart. They serve different purposes. Upper flange 74 connects the assembly to the source of water to be treated, the lower flange 68 provides the mounting of the assembly to the pipe section 40 of connection 32 of tank 12.

It can be seen that the—in view of number of connections bifunctional—special flange 46 of the tank 12 is replaced by a monofunctional standard sized flange 60, while the monofunctional special sprayer flange 50 is replaced by an arrangement of two separate flanges 68 and 74 also having standard dimensions.

Figure 4:
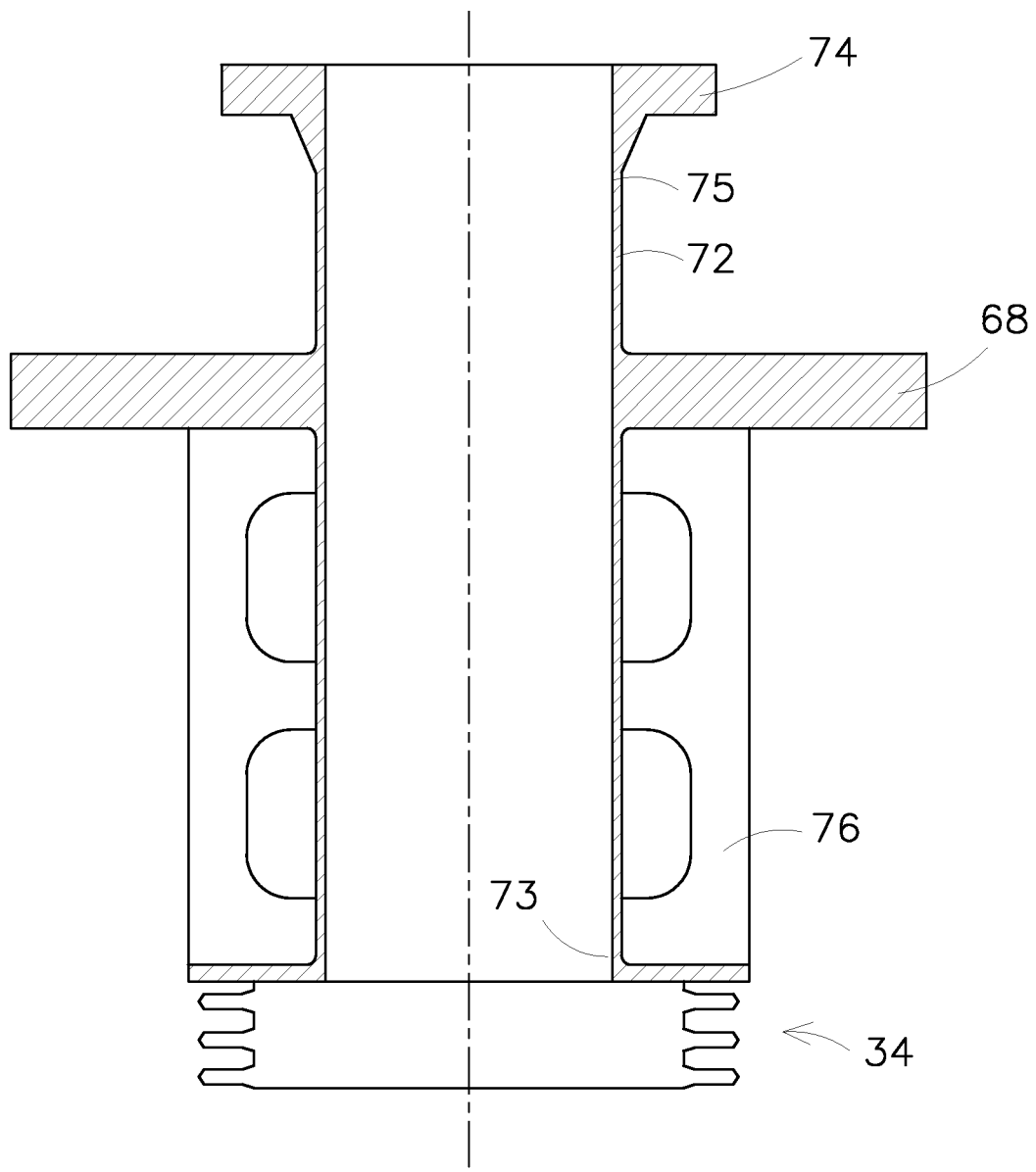
FIG. 4 shows an embodiment of an assembly of sprayer and connection according to the invention, as used in FIG. 3.

FIG. 4 shows the assembly of sprayer unit 34, connecting pipe section 72 and integral and flanges 68 and 74 respectively. Flange 74 is welded to upper end 75 of connecting pipe section 72. To lower end (lower flange) 73 sprayer unit 34 is mounted. The sprayer flange 68 is welded to the connecting pipe section 72 at a position between the respective ends 73 and 75. Wings 76 are provided at the periphery of the section 72 between flanges 68 and 73 for protecting the sprayer during (dis)mounting in the connection 32.

The assembly of sprayer unit 34, flanges 68 and 74 and connecting pipe section 72 can be pre-manufactured as a module allowing simple and fast installation.

The invention claimed is:

1. A device for treating water, comprising a vessel defining a treatment chamber, at least one sprayer, the sprayer arranged in the top of the treatment chamber and in fluid communication via a connection with a feed of water that is to be treated, at least one gas outlet, which is arranged on the top side of the vessel and is in fluid communication with the treatment chamber, for gases, which have been separated off from the water during treatment, at least one treating fluid inlet which is arranged in the vessel and has a feed connection for hot treating fluid and which opens out into the treatment chamber, and at least one water outlet for treated water, wherein the connection between the vessel and the sprayer and the feed of water to be treated comprises a pipe section having a first open end in fluid communication with the treatment chamber and a second open end provided with a first flange for connecting to a sprayer unit, the sprayer unit comprising a sprayer flange connected to said first flange, the sprayer flange carrying the at least one sprayer, which is in fluid communication with a connecting pipe at one end thereof, the connecting pipe extending through the first flange to an opposite end having a coupling flange connection to the feed of water.

2. A device according to claim 1, wherein the connecting pipe, sprayer flange and coupling flange are an integral part.

3. A device according to claim 1, wherein the connecting pipe has a first lower end carrying the sprayer and wherein the coupling flange is provided at a second upper end, the sprayer flange being provided at a position between the one end and an opposite end of the connecting pipe.

4. A device according to claim 2, wherein the connecting pipe has a first lower end carrying the sprayer and wherein the coupling flange is provided at a second upper end, the sprayer flange being provided at a position between the one end and an opposite end of the connecting pipe.

5. A device according to claim 1, wherein the first flange and the sprayer flange are of the same size.

6. A device according to claim 2, wherein the first flange and the sprayer flange are of the same size.

7. A device according to claim 3, wherein the first flange and the sprayer flange are of the same size.

8. A device according to claim 1, wherein the flanges have a commercially available, off the shelf size.

9. An assembly of a sprayer for use in a device for treating water and a sprayer flange connectable to a mating counter flange, the sprayer flange carrying the sprayer, which is in fluid communication with a connecting pipe at one end thereof, the opposite end of the connecting pipe having a coupling flange for connection to a feed of water.

10. An assembly according to claim 9, wherein the connecting pipe, sprayer flange and coupling flange are an integral part.

11. An assembly according to claim 9, wherein the connecting pipe has a first lower end carrying the sprayer and wherein the coupling flange is provided at a second upper end, the sprayer flange being provided at a position between the one end and the opposite end.

12. An assembly according to claim 10, wherein the connecting pipe has a first lower end carrying the sprayer and wherein the coupling flange is provided at a second upper end, the sprayer flange being provided at a position between the one end and the opposite end.

13. A method for degassing water using the device of claim 1, comprising feeding water to be degassed via the sprayer into the treatment chamber within the vessel, introducing hot degassing fluid via the treating fluid inlet into the treatment chamber, venting gases separated off via the at least one gas outlet, and discharging degassed water via the at least one water outlet.

14. A method for preheating water using the device of claim 1, comprising feeding water to be preheated via the sprayer into the treatment chamber within the vessel, introducing hot heating fluid via the treating fluid inlet into the treatment chamber, venting gases separated off via the at least one gas outlet, and discharging preheated water via the at least one water outlet.

\* \* \* \* \*